United States Patent
Mühlberger et al.

(10) Patent No.: US 6,478,378 B2
(45) Date of Patent: Nov. 12, 2002

(54) VEHICLE SEAT WITH HEIGHT ADJUSTER

(75) Inventors: Joachim Mühlberger, Grünstadt (DE); Ingo Teufel, Rockenhausen (DE)

(73) Assignee: Keiper GmbH & Co., Kaiserslautern (DE)

( * ) Notice: Subject to any disclaimer, the term of this patent is extended or adjusted under 35 U.S.C. 154(b) by 60 days.

(21) Appl. No.: 09/900,687

(22) Filed: Jul. 6, 2001

(65) Prior Publication Data

US 2002/0011746 A1 Jan. 31, 2002

Related U.S. Application Data

(63) Continuation of application No. PCT/EP00/10692, filed on Oct. 31, 2000.

(30) Foreign Application Priority Data

Nov. 9, 1999 (DE) .......................... 199 53 630

(51) Int. Cl.⁷ .................... B60N 2/42; B60R 21/00
(52) U.S. Cl. .................... 297/344.12; 297/344.13; 297/216.1; 297/216.14; 297/216.15; 297/216.16
(58) Field of Search .................. 297/344.12, 344.13, 297/216.1, 216.14, 216.15, 216.16

(56) References Cited

U.S. PATENT DOCUMENTS

| | | | |
|---|---|---|---|
| 3,848,923 A | | 11/1974 | Dehler |
| 3,957,304 A | * | 5/1976 | Koutsky et al. ..... 297/216.1 X |
| 4,784,434 A | * | 11/1988 | Iwami ..................... 297/216.1 |
| 5,005,894 A | | 4/1991 | Nagata |
| 5,556,159 A | | 9/1996 | Canteleux ................ 297/216.1 |
| 5,733,008 A | * | 3/1998 | Tame .................. 297/216.1 X |
| 5,882,080 A | | 3/1999 | Houghtaling et al. 297/216.1 X |
| 6,109,690 A | * | 8/2000 | Wu et al. ............ 297/216.14 X |
| 6,112,370 A | * | 9/2000 | Blanchard et al. .. 297/216.14 X |
| 6,250,705 B1 | * | 6/2001 | Zuch .................. 297/216.1 X |

FOREIGN PATENT DOCUMENTS

| DE | 41 29 497 A1 | 3/1993 |
|---|---|---|
| DE | 296 23 024 U1 | 11/1997 |

* cited by examiner

Primary Examiner—Rodney B. White
(74) Attorney, Agent, or Firm—Alston & Bird LLP

(57) ABSTRACT

In a vehicle seat, in particular an automobile seat, with a height adjuster (9) for adjusting the height of a seat frame of the vehicle seat relative to the vehicle structure, a locking device (13,23,36,38) is provided with a stop (31,33,36,38), which makes available an alternative force transmission between the seat frame and the vehicle structure in the event of a crash.

12 Claims, 3 Drawing Sheets

VEHICLE SEAT WITH HEIGHT ADJUSTER

CROSS REFERENCE TO RELATED APPLICATION

This is a continuation of International Application No. PCT/EP00/10692, filed Oct. 31, 2000, and designating the U.S.

BACKGROUND OF THE INVENTION

The present invention relates to a vehicle seat, in particular an automobile seat, with a height adjuster for adjusting the height of a seat frame of the vehicle seat relative to the vehicle structure.

In known vehicle seats of the above described kind, forces occurring in the event of a crash are transmitted from the seat frame, via the height adjuster, to the vehicle structure. In particular in the case of height adjusters that are actuatable by a motor, this disadvantageously stresses their drive, which is normally located between the seat frame and a movable element of the height adjuster.

SUMMARY OF THE INVENTION

In accordance with one aspect of the present invention, a vehicle seat is provided that performs advantageously in the event of a crash. In accordance with this aspect, the vehicle seat includes a seat frame mounted to a height adjuster. The height adjuster is for being connected between the seat frame and a vehicle structure, and adjusting the height of the seat frame relative to the vehicle structure. Further according to this aspect, a locking device is mounted to the vehicle seat for securing the height adjuster in a normal position during a normal condition, and for releasing the height adjuster in response to a crash in which the vehicle seat experiences at least a predetermined load. The locking device is provided with at least one stop that is engaged in response to the releasing of the locking device to establish an alternative force transmission path between the seat frame and the vehicle structure.

As a result of providing a locking device with a stop, which makes available an alternative force transmission between the seat frame and the vehicle structure in the event of a crash, it is possible to transmit the crash forces from the seat frame, for example, directly into the seat rails and, thus, into the vehicle floor as a part of the vehicle structure. This relieves a drive for the height adjuster, which is operative between the seat frame and the height adjuster, and protects the drive against destruction. The term "seat frame" is understood to include other kinds of seat cushion supports and seat back supports. Because the locking device is designed to transmit a force in the event of a crash, the stop differs from simple, supplementary locking devices, which solely function to prevent an opening of the respective main locking devices.

Preferably, the locking device is designed and constructed such that the stop responds irrespective of the adjusted height of the vehicle seat, namely each time about equally fast. It is preferred to provide two stops, which are operative in two different load directions and, thus, are in some ways not dependent on the type of load, i.e., they are operative both in a front end crash and in a rear end crash, but remain deactivated in the case of working loads and abusive loads. Preferably, activation occurs when a limit load is exceeded, in that, for example, the respective stop engages.

Preferably, the stop is activated by a change in geometry within the height adjuster. If the height adjuster is designed and constructed as a coupler mechanism, a preferably elastic and therefore reversible deformation of the height adjuster will be able to occur within a four-bar linkage, on the hump side or door sill side, or between the two four-bar linkages. Examples for reversible stop activations are spring elements or a force limit locking device with a reset element. The force needed for deforming the height adjuster corresponds to the aforesaid limit force.

In a preferred embodiment with a limit force locking device for activating the stop, a movably supported, spring-loaded locking pawl secures a bearing pin of a rocking arm of the height adjuster in the normal condition of the locking device. In the event of a crash, upon exceeding the limit force, the stop pawl releases the bearing pin for displacement in a guideway. This causes the geometry of the height adjuster to change, which then activates the stop. The spring force, which embodies the response threshold of the limit force locking device, and the arrangement of the guideway depend on the realization of the height adjuster kinematics and the occurring crash loads. It is necessary that the limit force locking device be capable of clearly disengaging and the stop of engaging over the entire height adjustment range and for each case of crash (front end crash and rear end crash).

In a further preferred embodiment, the load transmitting stop is located between the height adjuster and the seat frame. In this instance, at least one movably supported toothed pawl is located either on the height adjuster or on the seat frame, and an associated toothed element is provided respectively on the other part, with the toothed pawl and toothed element engaging each other in the event of a crash. It is preferred to provide for the front end crash and the rear end crash respectively one toothed pawl and respectively one associated toothed element. Preferably, the two thus-formed gear tooth systems do not mutually exert on each other any expelling forces in the event of a crash. The subdivision into two separate, load-direction-dependent stops has the advantage that it is possible to realize by nesting a load-level-adapted dimensioning and an axial securement of the stops being engaged.

In a particularly preferred embodiment, the limit force locking device for the activation and the stops for the load transmission are parts of a common locking device, for example, in that the locking pawl and the toothed pawls are provided on a common, movably supported lever. This simplifies manufacture of the locking device and makes it more cost favorable.

BRIEF DESCRIPTION OF THE DRAWINGS

In the following, the invention is described in greater detail with reference to an embodiment illustrated in the drawings, in which.

DETAILED DESCRIPTION OF THE INVENTION

Figure 1:
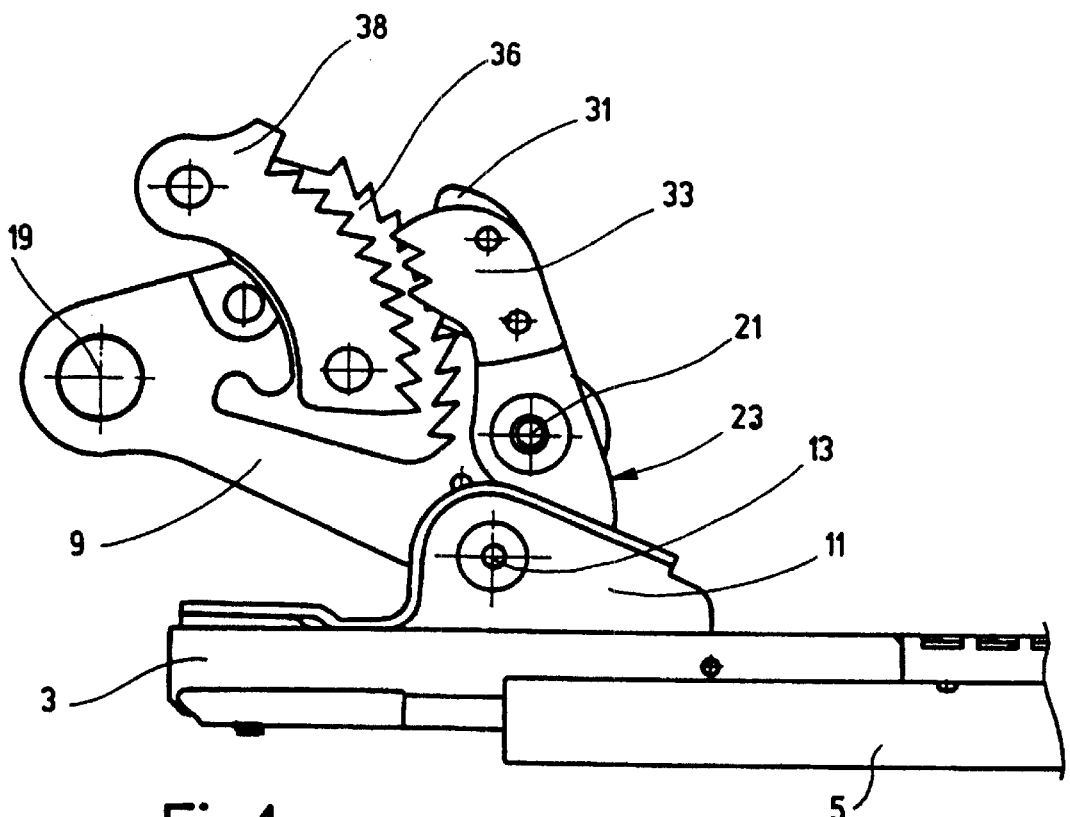
FIG. 1 is a partial view of the right outer side of the embodiment in the region of a rear rocker arm without showing the seat frame.

A vehicle seat 1, which is designed and constructed as the driver seat of an automobile, includes as a longitudinal adjuster, on each of its two sides, an upper rail 3, which extends for displacement in the longitudinal direction of the vehicle in a lower rail 5 that is made integral with the vehicle structure. To each upper rail 3, front and rear rocker arms 7 and 9 serving as height adjusters, are connected with a lower end. With their upper end, the rocker arms 7 and 9 are each connected to a seat frame 10, which supports a seat cushion and a seat back of vehicle seat 1. For the sake of clarity, the following describes the right side of the vehicle seat on the side of the hump. The left side of the vehicle seat on the side of the door sill is constructed in a corresponding way.

To connect the rear rocker arm 9 to upper rail 3, the upper rail 3 includes an upwardly projecting adapter 11 in the form of a bracket. A horizontally arranged bearing pin 13 is supported for rotation in adapter 11. In a normal condition, the lower bearing pin 13 is arranged approximately in the center of a slotted guideway 15 of rear rocker arm 9, and secured to the rear rocker arm 9 by means of a limit force locking device, as will be described further below. By means of an upper bearing pin 19, which is located, depending on the adjusted height, more or less above and behind lower bearing pin 13, when viewed in the travel direction, the rear rocker arm 9 is jointed to seat frame 10.

Somewhat above and in front of lower bearing pin 13, when viewed in the travel direction, the rear rocker arm 9 mounts a pawl pin 2.1, which is aligned parallel to the two bearing pins 13 and 19. On the outward directed side of rear rocker arm 9, the pawl pin 21 pivotably mounts a pawl lever 23. The lower arm of pawl lever 23 supports a stop pawl 25, which engages a receptacle 13' that is provided in an annular flange of lower bearing pin 13. A lock spring 27 is wound with its one end about pawl pin 21, and engages with its other end pawl lever 23 such that stop pawl 25 is pushed into receptacle 13' of lower bearing pin 13. Up to a certain limit load, which is not exceeded in the case of working and abusive loads, the limit force locking device is locked in force-locking engagement, i.e., the force component acting in the direction of guideway 15, which exerts an expelling force on stop pawl 23, is compensated by static friction and by the force of lock spring 27. Therefore, the lower bearing pin 13 is not rotatable relative to rear rocker arm 9, and stationarily arranged within guideway 15, so that this swivel joint causes rear rocker arm 9 to pivot relative to upper rail 3, while entraining lower bearing pin 13.

The upper arm of pawl lever 23 mounts a first and a second toothed pawl 31 and 33. The first toothed pawl 31 is made integral with pawl lever 23, whereas the second toothed pawl 33 consists of a small metal piece mounted to the outer side of pawl lever 23. The sawtooth-shaped teeth of the two toothed pawls 31 and 33 point approximately in the direction of upper bearing pin 19. However, the teeth of the first toothed pawl 31 are slightly downward oriented, whereas the teeth of the second toothed pawl have a slightly upward orientation.

Figure 2:
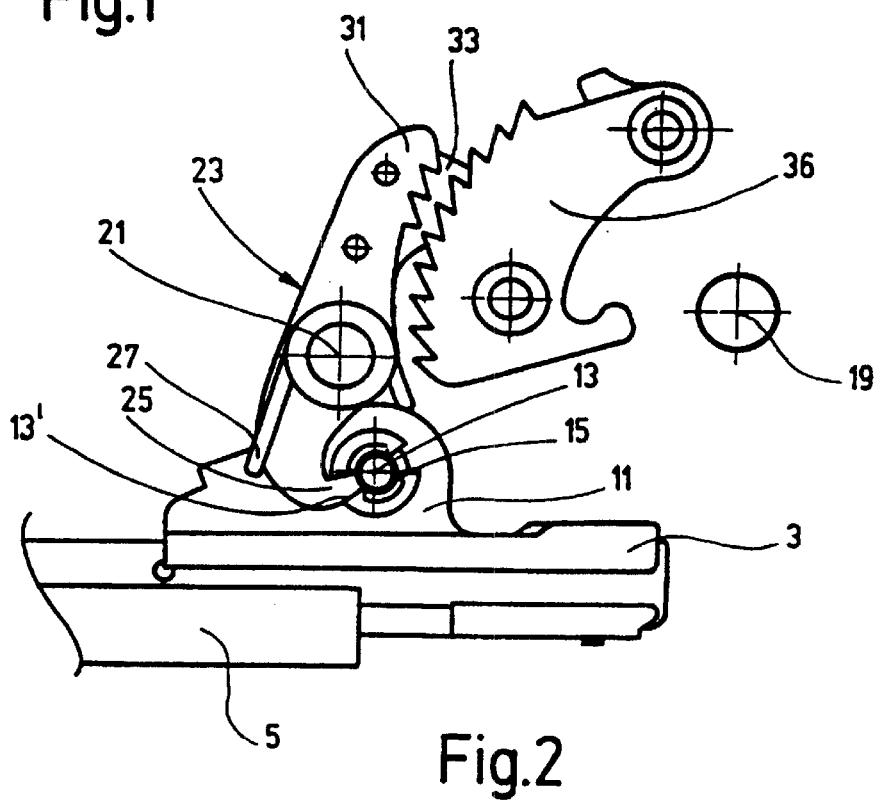
FIG. 2 is a partial view of the associated inner side in a normal condition without showing the rear rocker arm and seat frame.
Figure 3:
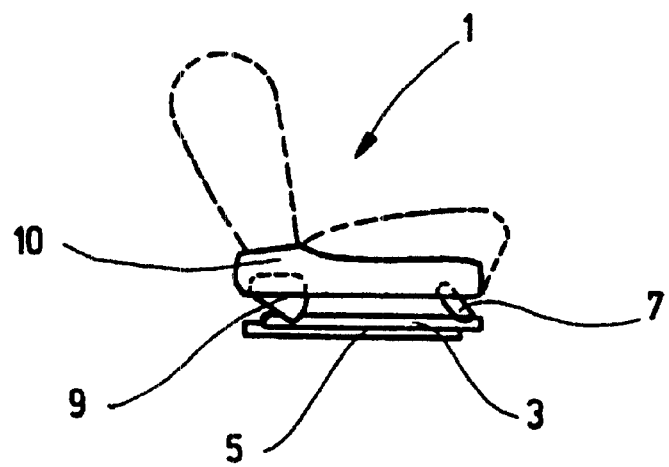
FIG. 3 is a schematically illustrated right side view of the embodiment.

At a small distance from these two toothed pawls 31 and 33, the seat frame 10 includes a first and a second toothed segment 36 and 38, which are arranged flat side by side. Their center of curvature is formed by upper bearing pin 19, and their sawtooth-shaped teeth direct radially outward toward the two toothed pawls 31 and 33. The teeth of first toothed segment 36 are directed slightly upward, whereas the teeth of the second toothed segment 38 have a slightly downward orientation. When the vehicle seat 1 is in its lowest position, the two toothed pawls 31 and 33 are oriented toward the upper end of the two toothed segments 36 and 38. However, when the vehicle seat 1 is in its highest position, the two toothed pawls 31 and 33 are oriented toward the lower end of the two frame-integrated toothed segments 36 and 38. FIGS. 1 and 2 show an intermediate position.

In the event of a front end crash, the superstructure of vehicle seat 1 with seat frame 10, the additional parts of vehicle seat 1 mounted thereon, and the user are accelerated forward relative to the substructure of vehicle seat 1 with rails 3 and 5. Initially, the occurring forces are transmitted via rocker arms 7 and 9 to upper rail 3, and further, via lower rail 5, into the vehicle structure. In this process, the force acting upon rear rocker arm 9 exceeds the limit load of the limit force locking device, which is dependent on the force of lock spring 27 and the wedge angle of stop pawl 25, i.e., stop pawl 25 is pushed out of receptacle 13'. The rear rocker arm 9 with its guideway 15 moves downward relative to lower bearing pin 13, so that the lower bearing pin 13 comes into contact with the upper end of guideway 15, thereby changing the geometry of the height adjuster. As a result of pushing out stop pawl 25, the pawl lever 23 pivots about pawl pin 21.

Figure 4:
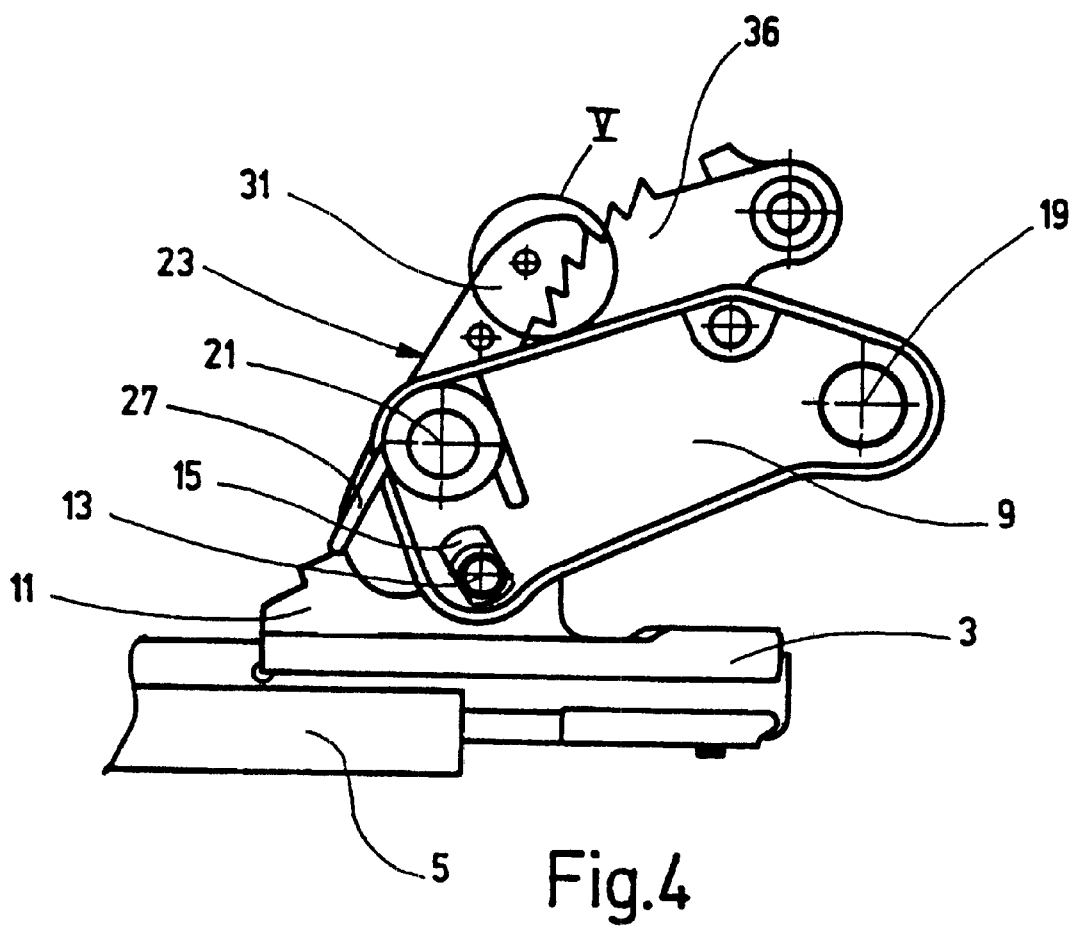
FIG. 4 is a view corresponding to FIG. 2 showing the rear rocker arm in the case of a front end crash.

This causes the first toothed pawl 31 to engage the first toothed segment 36, as shown in FIG. 4, and to form a stop. As a result of the curved shape of first toothed segment 36 with an approximately constant distance of toothed pawl 31 in the starting position, this activation of the stop (and the duration of the response) do not depend on the height of vehicle seat 1. The forces exerted by seat frame 10 are transmitted, on the one hand via upper bearing pin 19, and on the other hand via first toothed segment 36, first toothed pawl 31 of pawl lever 23, and pawl pin 21, to rear rocker arm 9, and from same via lower bearing pin 13 to adapter 11 of upper rail 3. This relieves the drive of the height adjuster that is operative between the rear rocker arm 9 and seat frame 10.

Figure 5:
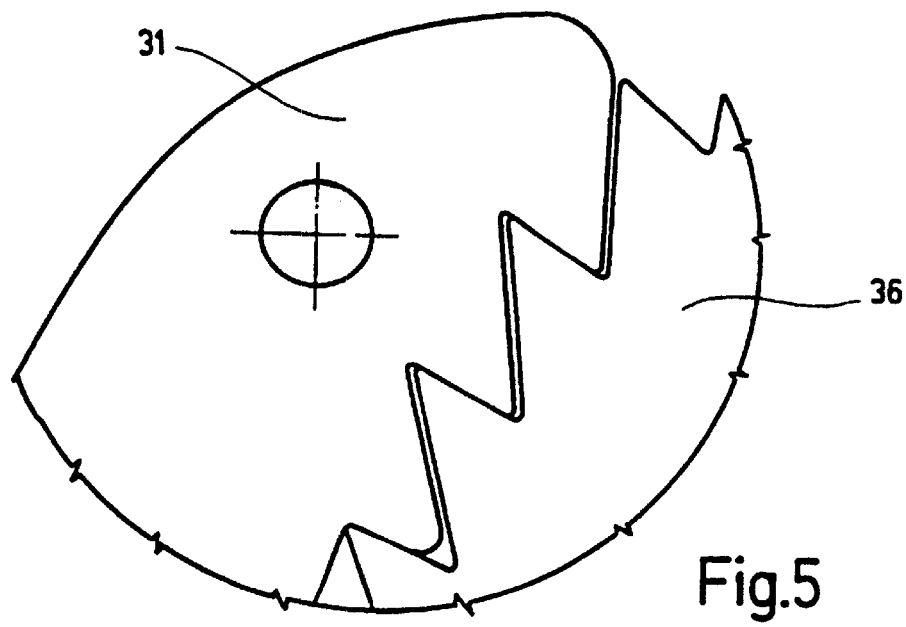
FIG. 5 is an enlarged view of the region V in FIG. 4.
Figure 6:
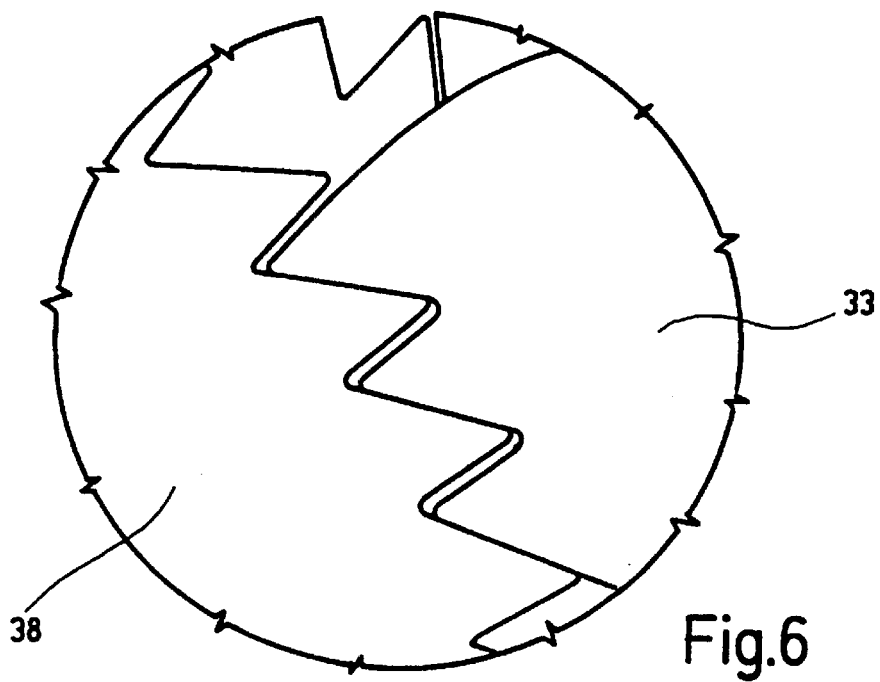
FIG. 6 is an enlarged view corresponding to FIG. 5 of the outward directed side of the associated region.

In the event of a rear end crash, the substructure of vehicle seat 1 is accordingly accelerated forward relative to the superstructure. The limit load of the limit force locking device is likewise exceeded. In so doing, the lower bearing pin 13 is released, and it comes into contact with the lower end of guideway 15, thereby changing the geometry of the height adjuster. The pawl lever 23 pivots likewise. In so doing, the second toothed pawl 33 comes to engage now second toothed segment 38, forms a further stop, and transmits a portion of the occurring forces. With respect to the angle relationships between the teeth, the stops are designed such that in the case of a rear end crash, the first (front end crash) gear tooth system 31 and 36 exerts no expelling forces on the second (rear end crash) gear tooth system 33 and 38, and vice versa. The situation in the case of a front end crash is shown in FIGS. 5 and 6.

What is claimed is:

1. A vehicle seat for being mounted to a vehicle structure and for performing advantageously in the event of a crash, comprising:
   a seat frame mounted to a height adjuster, wherein the height adjuster is for being connected between the seat frame and the vehicle structure and adjusting the height of the seat frame relative to the vehicle structure;
   a locking device mounted to the vehicle seat for securing the height adjuster in a normal position during a normal condition, and for releasing the height adjuster in response to a crash in which the vehicle seat experiences at least a predetermined load; and at least one stop that is engaged in response to the releasing of the locking device to establish an alternative force transmission path between the seat frame and the vehicle structure.

2. A vehicle seat according to claim 1, wherein the stop is a first stop, the alternative force transmission path for transmitting force is a first path for transmitting force in a first direction, the vehicle seat further includes a second stop that is engaged in response to the releasing of the locking device to establish an alternative second path for transmitting force in a second direction between the seat frame and the vehicle structure, and the second direction is different from the first direction.

3. A vehicle seat according to claim 2, wherein the first path is for transmitting force in the event of front end crash of the vehicle and the second path is for transmitting force in the event of a rear end crash of the vehicle, the first stop is a first toothed pawl, a first toothed element meshes with the first toothed pawl to form a first gear tooth system in the event of a front end crash, the second stop is a second toothed pawl, and a second toothed element meshes with the second toothed pawl to form a second gear tooth system in the event of a rear end crash.

4. A vehicle seat according to claim 3, wherein in the event of a crash in which the vehicle seat experiences at least the predetermined load the two gear tooth systems mutually exert no expelling forces on each other.

5. A vehicle seat according to claim 2, wherein the first path is for transmitting force in the event of front end crash and the second path is for transmitting force in the event of a rear end crash.

6. A vehicle seat according to claim 1, wherein a change in geometry of the height adjuster occurs in response to the locking device releasing the height adjuster, and the stop is activated by the change in geometry of the height adjuster.

7. Vehicle seat of claim 1, wherein a movably supported, spring-loaded pawl of the of the locking device secures a bearing pin of a rocker arm of the height adjuster in the normal condition.

8. A vehicle seat according to claim 7, wherein the locking device includes a movably supported lever, and the lever includes both the pawl and the stop.

9. A vehicle seat according to claim 8, wherein the pawl releases the bearing pin for movement in a guideway of the rocker arm in response to a crash in which the vehicle seat experiences at least the predetermined load.

10. A vehicle seat according to claim 7, wherein the pawl releases the bearing pin for movement in a guideway of the rocker arm in response to a crash in which the vehicle seat experiences at least the predetermined load.

11. A vehicle seat according to claim 1, wherein the stop is a toothed pawl that is movably supported on the height adjuster or on the seat frame, and a toothed element of the seat frame or the height adjuster is engaged by the toothed pawl to establish the alternative force transmission path between the seat frame and the vehicle structure.

12. A vehicle seat according to claim 1, wherein the stop is a toothed pawl, and a toothed element meshes with the toothed pawl to form the alternative force transmission path between the seat frame and the vehicle structure.

* * * * *